J. D. MOREY.
SHAFT COUPLINGS FOR VEHICLES.
No. 171,159.   Patented Dec. 14, 1875.
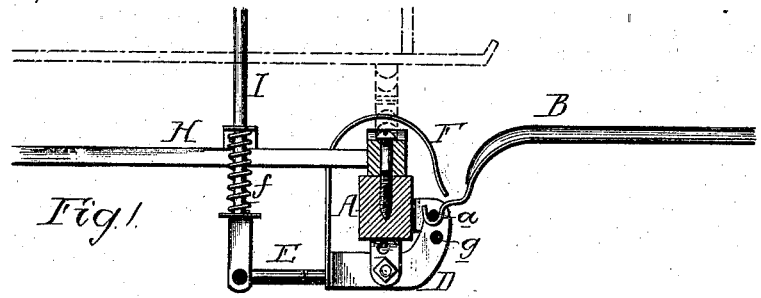
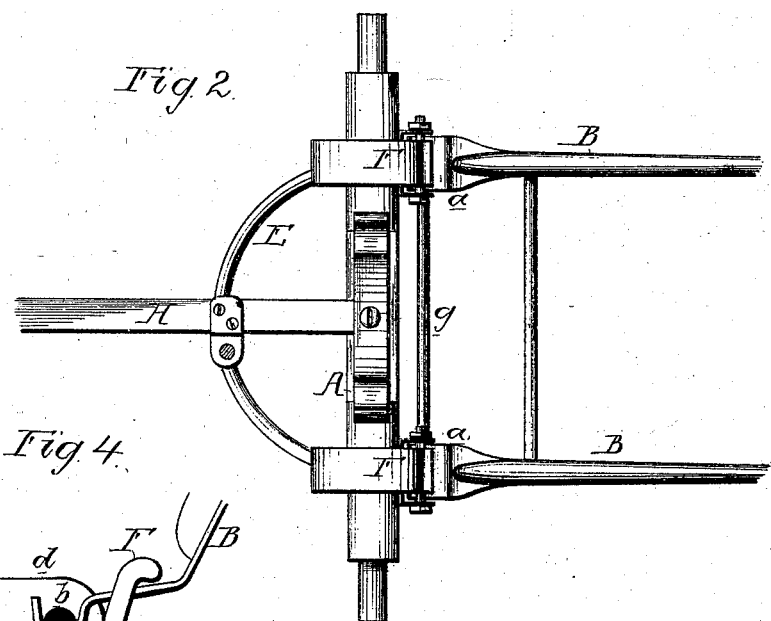
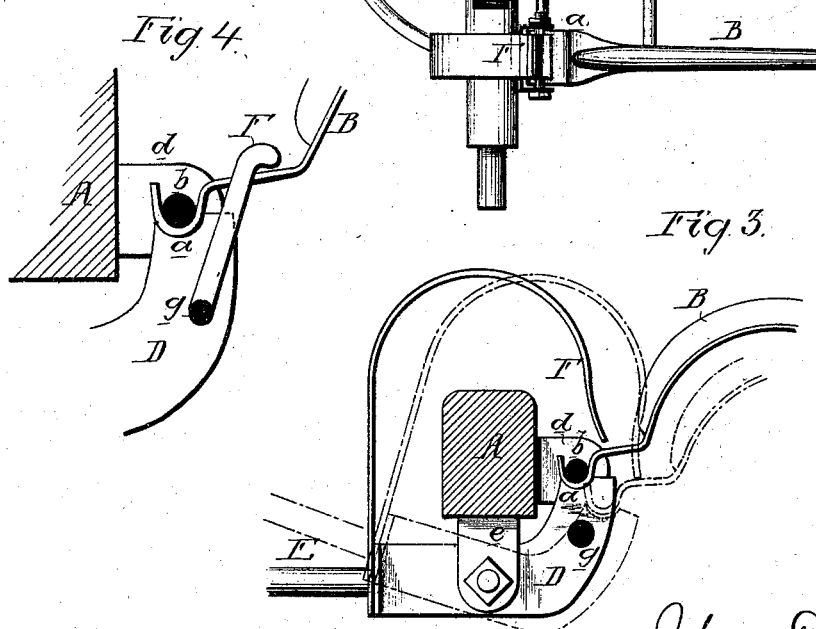
Witnesses: Harry Smith
Thomas McIlvain
John D. Morey
by his Attorneys
Howson & Son

UNITED STATES PATENT OFFICE.

JOHN D. MOREY, OF PHILADELPHIA, PENNSYLVANIA.

IMPROVEMENT IN SHAFT-COUPLINGS FOR VEHICLES.

Specification forming part of Letters Patent No. 171,159, dated December 14, 1875; application filed November 30, 1875.

*To all whom it may concern:*

Be it known that I, JOHN D. MOREY, of Philadelphia, Pennsylvania, have invented an Improved Shaft or Pole Coupling for Vehicles, of which the following is a specification:

The object of my invention is to so construct a shaft-coupling for vehicles that an unmanageable horse can be readily detached; and this object I attain in the manner which I will now proceed to describe, reference being had to the accompanying drawing, in which—

Figure 1 is a vertical sectional view of sufficient of a carriage and its shafts to illustrate my invention; Fig. 2, a plan view of the same; Fig. 3, an enlarged section, illustrating the operation of the device; and Fig. 4, a detached view of a modification.

A is the front axle of the vehicle, and B the shafts, the inner ends of the latter being attached by means of open hooks $a$ to pins $b$, secured to brackets $d$ on the said front axle. On the under side of the axle A, in line with the end of each shaft, are brackets $e$, to each of which is hung a lever, D, the inner ends of the two levers being connected by means of a curved bar, E, and their outer ends, when in the position shown in Fig. 1, projecting under the hooks $a$ of the shafts B, and serving to keep the same in their proper vertical position with respect to the pins $b$.

In the present instance the inner end of each of the levers D is provided with a curved arm, F, which extends downward until it touches or nearly touches the upper edge of the plate, which forms the hook $a$ of the shaft, with which said arm F corresponds. Passing through a bearing on the perch-pole H of the vehicle is a rod, I, the upper end of which extends into the body, (see dotted lines, Fig. 1,) and is there furnished with a suitable operating knob or handle, while its lower end is furnished with an opening adapted to the bar E. The rod I is acted upon by a spring, $f$, the tendency of which is to depress said rod and keep the lever D in the position shown in Fig. 1. The levers D are connected together at the front by means of the transverse bar $g$, so as to maintain at all times their proper lateral position in relation to each other, and to the hooks $a$ of the shafts B.

The operation of the above-described device is as follows: Supposing the parts to be in their normal position, as shown in Fig. 1, and in full lines, Fig. 3, as soon as the horse becomes unmanageable the occupant of the vehicle seizes the upper end of the rod I, and elevates the same, so as to depress the outer ends of the levers D. This deprives the hooks $a$ of their support, and the same movement causes the descent of the ends of the curved arms F, which strike said hooks, and force them down clear of the pins $b$, as shown by dotted lines, Fig. 3, when the shafts are entirely free from the vehicle, and the horse is at liberty to run.

It will be evident that by the above arrangement an unmanageable horse can be almost instantly detached from a vehicle, and this can be effected by the occupant without moving from his seat, or incurring any risk.

The device can be applied to the pole, as well as to the shafts of a vehicle, and, irrespective of its safety, affords a simple and ready means of attaching or detaching said pole or shafts.

Detaching-arms F of different form and arrangement from that shown may be employed without departing from my invention; for instance, said arms F may be attached to or form part of the bars $g$ of the levers D, as shown in Fig. 4, or may form part of the levers themselves, the result in either case being the same.

I prefer to connect the inner ends of the levers B together by means of the curved bar E, as this form does not interfere with the free turning of the front axle.

Different forms of springs may be employed for depressing the rod I, and, if desired, the spring may be placed within the carriage, instead of beneath the same.

It will be understood that my improved coupling can be used with equal facility in cases where the shaft or pole is connected to the carriage at but a single point instead of at two points, as shown and described.

I claim as my invention—

1. The combination of the shaft or pole of a vehicle connected to the same by open hooks $a$ with the levers D and arms F, substantially as set forth.

2. The combination of the shafts, with their open hooks, the levers D, their arms F, and the curved bar E, with the spring-rod I, projecting into the vehicle, as set forth.

In testimony whereof I have signed my name to this specification in the presence of two subscribing witnesses.

JOHN D. MOREY.

Witnesses:
 HARRY HOWSON, Jr.,
 HARRY SMITH.